United States Patent
Yanagibayashi (10) Patent No.: US 11,413,555 B2
(45) Date of Patent: Aug. 16, 2022

(54) LIQUID DELIVERY DEVICE AND LIQUID CHROMATOGRAPH EQUIPPED WITH LIQUID DELIVERY DEVICE

(71) Applicant: Shimadzu Corporation, Kyoto (JP)

(72) Inventor: Jun Yanagibayashi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 366 days.

(21) Appl. No.: 16/611,331

(22) PCT Filed: May 10, 2017

(86) PCT No.: PCT/JP2017/017755
§ 371 (c)(1),
(2) Date: Nov. 6, 2019

(87) PCT Pub. No.: WO2018/207295
PCT Pub. Date: Nov. 15, 2018

(65) Prior Publication Data
US 2020/0072204 A1   Mar. 5, 2020

(51) Int. Cl.
*B01D 15/10* (2006.01)
*G01N 30/88* (2006.01)
(Continued)

(52) U.S. Cl.
CPC .............. *B01D 15/10* (2013.01); *F04B 23/04* (2013.01); *G01N 30/88* (2013.01); *G01N 2030/322* (2013.01); *G01N 2030/347* (2013.01)

(58) Field of Classification Search
CPC ........ G01N 30/16; G01N 30/20; G01N 30/32; G01N 30/34; G01N 30/88;
(Continued)

(56) References Cited

U.S. PATENT DOCUMENTS 9,841,406 B2 * 12/2017 Yotani ................ G01N 35/1097

FOREIGN PATENT DOCUMENTS

| JP | H07-083400 A | 3/1995 | |
| JP | 2001-343372 A | 12/2001 | |
| JP | 4313501 B2 * | 8/2009 | ............. G01N 30/24 |

OTHER PUBLICATIONS

International Search Report and Written Opinion dated Aug. 8, 2017 in corresponding application No. PCT/JP2017/017755; 10 pages.

* cited by examiner

*Primary Examiner* — Justin N Olamit
(74) *Attorney, Agent, or Firm* — Maier & Maier, PLLC (57) ABSTRACT

A liquid delivery device includes at least one liquid delivery pump that delivers liquid, at least one main channel communicating with an outlet of the liquid delivery pump, at least one branch channel branched from the main channel, and a switching valve that has, as a port for connecting channels, at least a port to which the main channel is connected, a port to which the branch channel is connected, at least one output port for outputting liquid delivered by the liquid delivery pump through the main channel, and at least one drain port leading to a drain, and is configured to be selectively switched to a first state, in which the main channel is connected to the output port while the branch channel is not connected to any channel, and a second state in which the branch channel is connected to the drain port while the main channel is not connected to any channel.

10 Claims, 8 Drawing Sheets

(51) Int. Cl.
*F04B 23/04* (2006.01)
*G01N 30/34* (2006.01)
*G01N 30/32* (2006.01)

(58) Field of Classification Search
CPC ....... G01N 2030/201; G01N 2030/202; G01N 2030/207; G01N 2030/208; B01D 15/10–1892; F04B 23/04
See application file for complete search history.

FIG. 1

FIRST STATE

FIG. 2

SECOND STATE

LIQUID DELIVERY DEVICE AND LIQUID CHROMATOGRAPH EQUIPPED WITH LIQUID DELIVERY DEVICE

FIELD

The present disclosure relates to a liquid delivery device that performs liquid delivery using a liquid delivery pump, and a liquid chromatograph including the liquid delivery device.

BACKGROUND

In a liquid chromatograph, since stability of a liquid delivery flow rate of a mobile phase has a high influence on an analysis result, various methods are taken to enhance liquid delivery stability of a liquid delivery pump. As a method of enhancing the liquid delivery stability of the liquid delivery pump, there is an active method, in which a pressure sensor is disposed on a discharge channel through which a mobile phase discharged from the liquid delivery pump flows, liquid delivery pressure by the liquid delivery pump is monitored by the pressure sensor, and driving of the liquid delivery pump is controlled so as to stabilize the liquid delivery pressure. Further, there is another method in which a damper whose internal capacity changes according to an increase or decrease of the liquid delivery pressure by the liquid delivery pump is disposed on the discharge channel through which the mobile phase discharged from the liquid delivery pump flows, and the damper absorbs a fluctuation of the liquid delivery pressure by the liquid delivery pump.

However, there has been a problem that, when the pressure sensor or the damper is disposed on the discharge channel through which the mobile phase discharged from the liquid delivery pump flows, replaceability of a solvent in an analysis channel downstream of the liquid delivery pump and accuracy of composition of the mobile phase are deteriorated due to the internal capacity of the damper or the pressure sensor. Further, there has also been a problem that, when gradient analysis in which the composition of the mobile phase is analyzed while being changed temporally is performed, a change in the composition of the mobile phase is delayed due to the internal capacity of the damper or the pressure sensor, and analysis time is prolonged. Furthermore, there has also been a problem that, in a case where the damper is provided on the discharge channel, since the internal capacity of the damper is proportional to system pressure, when the system pressure fluctuates, the delay time of the gradient also fluctuates, and the reproducibility of an analysis result between analyses and devices is impaired.

In order to solve the above problems, it has been proposed to provide a branch channel branched from a channel (main channel) through which the mobile phase discharged from the liquid delivery pump flows, and to dispose a pressure sensor or a damper on the branch channel (see Patent Document 1). According to the proposed technique, during analysis, the pressure sensor or the damper are caused to function, while a drain valve provided downstream of the pressure sensor or the damper of the branch channel is closed so that the mobile phase does not flow in the branch channel. In this manner, the liquid delivery flow rate can be stabilized. After the analysis is finished, a predetermined solvent is delivered by the liquid delivery pump in a state where the drain valve is closed, so that a solvent in the analysis channel can be replaced promptly.

As described above, according to the technique disclosed in Patent Document 1, the mobile phase does not flow through the pressure sensor or the damper having a large internal capacity during analysis or replacement of a solvent. Accordingly, the problems of the delay of the gradient or the deterioration in replaceability of a solvent are solved.

Patent Document 1: Japanese Patent Laid-open Publication No. 07-083400

SUMMARY

In the technique disclosed in Patent Document 1, a purge in the branch channel is performed by delivering a predetermined solvent by the liquid delivery pump in a state where the drain valve of the branch channel is open. Usually, the main channel is connected to the analysis channel of the liquid chromatograph, and since a separation column having a large channel resistance is provided on the analysis channel, channel resistance on the main channel side is significantly larger than channel resistance on the branch channel side. For this reason, if liquid delivery by the liquid delivery pump is performed in a state where the drain valve of the branch channel is open, almost all of the delivered solvent flows to the branch channel side, and the purge in the branch channel is efficiently performed.

The above technique is premised on a channel having a large channel resistance connected to the main channel, and a case where the channel resistance of the separation column provided on the analysis channel is small or a case where the separation column is not provided is not considered. In a case where the channel resistance of a channel as an output destination connected to the main channel is small, the channel resistance on the main channel side becomes small, and a solvent for purging flows into the analysis channel when the branch channel is purged. An object of the present invention is to make it possible to apply the technique disclosed in Patent Document 1 even in such a case.

That is, an object of the present invention is to allow a branch channel to be purged with high efficiency in a liquid delivery device having a main channel and the branch channel on a downstream side of a liquid delivery pump, regardless of the magnitude of channel resistance of a channel as an output destination connected to the main channel.

A liquid delivery device according to the present invention includes at least one liquid delivery pump for delivering liquid; at least one main channel communicating with an outlet of the liquid delivery pump, at least one branch channel branched from the main channel, and a switching valve comprising, as a port for connecting channels, at least a port to which the main channel is connected, a port to which the branch channel is connected, at least one output port for outputting liquid delivered by the liquid delivery pump through the main channel, and at least one drain port leading to a drain, the switching valve is configured to be selectively switched to a first state and a second state, the first state is a state in which the main channel is connected to the output port while the branch channel is not connected to any channel, and the second state is a state in which the branch channel is connected to the drain port while the main channel is not connected to any channel.

The liquid delivery device of the present invention may be configured to further include a plurality of mixers whose capacities are different from each other, and the mixers have one end and the other end connected to the port of the switching valve respectively. In the first state, the switching valve may be configured to selectively interpose any one of the plurality of mixers between the main channel and the output port. With this configuration, it is possible for the user to selectively use mixers of different capacities without changing a pipe.

Further, the liquid delivery device of the present invention may be configured to include a plurality of the liquid delivery pumps, and a plurality of the main channels and the branch channels corresponding to each of the plurality of the liquid delivery pumps. The switching valve may be configured to connect all the main channels to the output port while not connecting all the branch channels to any channel in the first state, and to connect all the branch channels to the drain port while not connecting all the main channels to any channel. With the above configuration, a channel structure of the liquid delivery device provided with a plurality of liquid delivery pumps can be switched by a single switching valve.

In a preferred embodiment in a case where a plurality of liquid delivery pumps are included, the switching valve includes a plurality of the output ports corresponding to the plurality of the main channels, and a plurality of the drain ports corresponding to the plurality of the branch channels, and the switching valve is configured to connect all the main channels to the corresponding output ports in the first state, and to connect all the branch channels to the corresponding drain ports in the second state.

In another preferred embodiment in a case where a plurality of liquid delivery pumps are included, the switching valve is configured to connect all the main channels to the common output port in the first state, and to connect all the branch channels to the common drain port in the second state.

A damper is preferably provided on the branch channel of the liquid delivery device according to the present invention to suppress fluctuation in liquid delivery pressure by the liquid delivery pump. By providing the damper on the branch channel, it is possible to alleviate the fluctuation of the liquid delivery pressure by the liquid delivery pump, and stabilization of a liquid delivery flow rate can be achieved.

In the liquid delivery device according to the present invention, the switching valve is preferably configured to be able to be selectively switched to a third state in which a system including the liquid delivery pump, the main channel, and the branch channel is set to be a closed system.

As a preferred embodiment of the above case, there is an example where the switching valve is configured to communicate between the port to which the main channel is connected and the port to which the branch channel is connected in the third state.

In a case where the switching valve is configured to be able to be switched also to the third state described above, a leakage amount calculation part configured to calculate a leakage amount in a system including the liquid delivery pump, the main channel, and the branch channel based on a liquid delivery flow rate by the liquid delivery pump in the third state can be further provided. In a case where the system including the liquid delivery pump, the main channel, and the branch channel is closed, that is, a closed system, liquid should not be delivered even if the liquid delivery pump is driven to discharge. However, in a case where liquid leakage occurs in the liquid delivery pump, the switching valve, or the like, liquid delivery by the liquid delivery pump is performed even when the system including the liquid delivery pump, the main channel, and the branch channel is a closed system. Then, a liquid delivery amount by the liquid delivery pump at that time is the leakage amount. Alternatively, liquid delivery is pressurized by the liquid delivery pump in a state where the system including the liquid delivery pump, the main channel, and the branch channel is set to be a closed system, and then a pressure drop of the system may be measured in a state in which the liquid delivery is stopped. The amount of leak can be estimated from the range of the pressure drop or the slope of the pressure drop with respect to time.

A liquid chromatograph according to the present invention includes an analysis channel, the above liquid delivery device configured to deliver a mobile phase through the analysis channel, a sample injection part configured to inject a sample into the analysis channel, a separation column that is provided downstream of the sample injection part on the analysis channel to separate a sample injected into the analysis channel by the sample injection part into components, and a detector that is provided downstream of the separation column on the analysis channel, and detects a sample component separated by the separation column.

In a liquid delivery device according to the present invention, a switching valve can selectively switch between a first state, in which a main channel is connected to an output port while a branch channel is not connected to any channel, and a second state, in which the branch channel is connected to a drain port while the main channel is not connected to any channel. Accordingly, a solvent for purging does not flow in the main channel by selecting the second state when the inside of the branch channel is purged, and the inside of the branch channel can be purged with high efficiency regardless of the magnitude of channel resistance of a channel as an output destination connected to the main channel. Further, since an element with a large internal capacity, such as a pressure sensor and a damper, is not provided in the main channel, delay of the gradient of the mobile phase is small, and replacement efficiency of a solvent is also excellent.

In the liquid chromatograph according to the present invention, since the mobile phase is delivered by the above-described liquid delivery device, delay of the gradient of the mobile phase during analysis is small, and improvement in the reproducibility of an analysis result is also achieved. Furthermore, replacement of a solvent in the analysis channel after analysis is finished can be performed promptly.

DETAILED DESCRIPTION

Hereinafter, embodiments $1a$ to $1d$ of a liquid delivery device 1 according to the present invention, and an embodiment of a liquid chromatograph including the liquid delivery device 1 will be described with reference to the drawings. Note that, in each of the embodiments $1a$ to $1d$ of the liquid delivery device 1, parts having the same functions are denoted by the same reference numerals.

The first embodiment $1a$ of the liquid delivery device 1 according to the present invention will be described using FIGS. 1 to 3.

This embodiment $1a$ mainly includes a liquid delivery pump 2 that delivers a solvent selected by a solvent selection valve 4 among a plurality of types of solvents, and a switching valve $12a$ configured to selectively switch a channel configuration. A main channel 6 through which liquid discharged by the liquid delivery pump 2 flows and a branch channel 8 branched from the main channel 6 are provided downstream of the liquid delivery pump 2. The downstream ends of the main channel 6 and the branch channel are connected to different ports "b" and "c" of the switching valve $12a$.

On the branch channel 8, a damper 10, whose internal capacity changes in accordance with an increase or decrease of liquid delivery pressure by the liquid delivery pump 2, is provided. Note that, although only the damper 10 is provided on the branch channel 8 in the embodiment $1a$ and the embodiments $1b$ to $1d$ described below, a pressure sensor can be provided on the branch channel 8 as necessary.

The switching valve $12a$ includes four ports "a" to "d" and is a rotary multi-port valve that switches a combination of ports to be connected by rotating a rotor provided with a channel $14a$ for connecting between the ports "a" to "d". The ports "a" to "d" of the switching valve $12a$ are disposed at equal intervals counterclockwise from the port "a" on the same circumference, and an interval between the ports corresponds to, for example, 60 degrees in a rotation angle of the rotor. A length of the channel $14a$ provided on the rotor is a length equivalent to a distance between ports adjacent to each other.

The port "a" of the switching valve $12a$ is an output port to which a discharge channel 16 communicating with an analysis channel of a liquid chromatograph is connected. A downstream end of the main channel 6 is connected to the port "b" of the switching valve $12a$, and a downstream end of the branch channel 8 is connected to the port "c". The port "d" of the switching valve $12a$ is a drain port to which a drain channel 18 leading to the drain is connected.

The switching valve $12a$ is configured to be able to selectively switch between a first state (a state of FIG. 1) in which the ports "a" and "b" are connected, a second state (a state of FIG. 2) in which the ports "c" and "d" are connected, and a third state (a state shown in FIG. 3) in which the ports "b" and "c" are connected.

Figure 1:
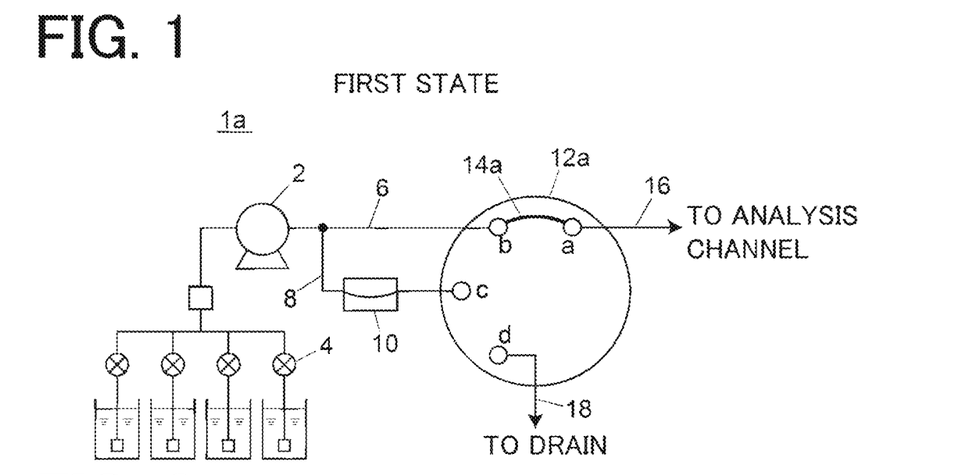
FIG. 1 is a channel configuration diagram when a switching valve is in a first state in one embodiment of a liquid delivery device.

When the switching valve $12a$ is in the first state, as shown in FIG. 1, the main channel 6 is connected to the discharge channel 16 leading to the analysis channel, while the branch channel 8 is not connected to any channel. When the switching valve $12a$ is in the first state in the analysis by the liquid chromatograph, a solvent discharged by the liquid delivery pump 2 is supplied to the analysis channel. At this time, a downstream end of the branch channel 8 is closed, and a solvent discharged by the liquid delivery pump 2 does not flow in the branch channel 8. Since the internal capacity of the damper 10 provided on the branch channel 8 changes in accordance with liquid delivery pressure by the liquid delivery pump 2, a fluctuation of the liquid delivery pressure by the liquid delivery pump 2 is absorbed by the damper 10 on the branch channel 8, and stabilization of a liquid delivery flow rate to the analysis channel is achieved. Further, when a solvent in the analysis channel is replaced with a predetermined solvent after analysis by the liquid chromatograph is finished, the switching valve $12a$ is in the first state.

Since there is no element with a large internal capacity, such as the damper 10 or a pressure sensor, existing on the main channel 6, delay hardly occurs in a gradient of a mobile phase composition in a case where a gradient analysis, in which a composition of a mobile phase is analyzed while being changed temporally, is performed. Further, replacement of a solvent in the analysis channel can also be performed promptly.

Figure 2:
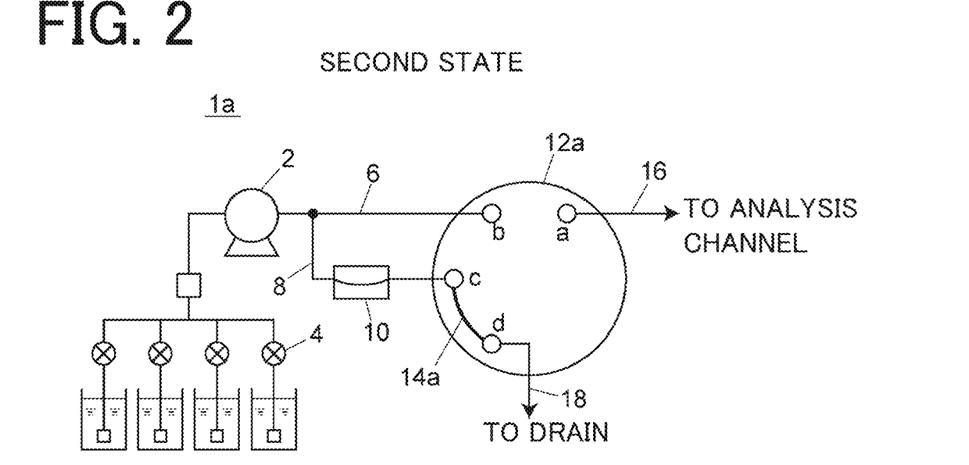
FIG. 2 is a channel configuration diagram when the switching valve is in a second state in the embodiment.

When the switching valve $12a$ is in the second state, as shown in FIG. 2, the branch channel 8 is connected to the drain channel 18 leading to the drain, while the main channel 6 is not connected to any channel. By bringing the switching valve $12a$ into this second state when the inside of the branch channel 8 is purged, the main channel 6 and the analysis channel are disconnected, so that the entire solvent discharged by the liquid delivery pump 2 can be reliably supplied to the branch channel 8, and it is possible to prevent part of a solvent for purging from flowing into the analysis channel.

Figure 3:
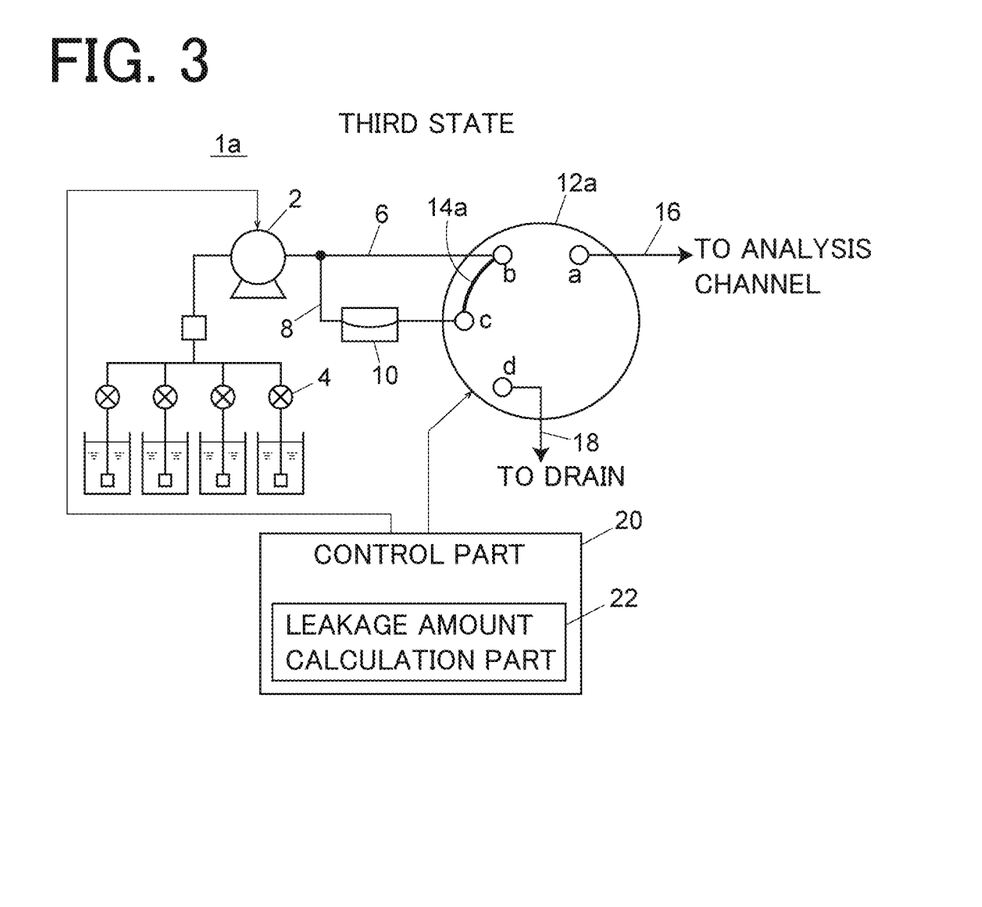
FIG. 3 is a channel configuration diagram when the switching valve is in a third state in the embodiment.

When the switching valve $12a$ is in the third state, as shown in FIG. 3, the downstream end of the main channel 6 and the downstream end of the branch channel 8 communicate with each other via the channel $14a$. In this manner, a system including the liquid delivery pump 2, the main channel 6, and the branch channel 8 becomes a closed system. In this state, liquid delivery by the liquid delivery pump 2 should not be able to be performed. In a case where liquid delivery by the liquid delivery pump 2 can be performed, liquid leakage is considered to occur in this system.

In view of the above, as shown in FIG. 3, a control part 20 that controls operation of the liquid delivery pump 2 and the switching valve $12a$ may be provided with a leakage amount calculation part 22 that obtains a leakage amount in a system including the liquid delivery pump 2, the main channel 6, and the branch channel 8 based on a liquid delivery amount by the liquid delivery pump 2 when the switching valve $12a$ is set to be in the third state. In this manner, liquid leakage in the liquid delivery pump 2 and the switching valve $12a$ can be detected automatically. Alternatively, the leakage amount calculation part 22 may estimate a leakage amount from a range of a pressure drop or a slope of a pressure drop with respect to time when the liquid delivery pump pressurizes liquid delivery in a state where a system including the liquid delivery pump, the main channel, and the branch channel is set to be a closed system, and then a pressure drop of the system is measured in a state where the liquid delivery is stopped. Note that the control part 20 is realized by a dedicated computer or a general-purpose personal computer, and the leakage amount calculation part 22 is a function obtained by executing a program stored in the computer.

The second embodiment 1b of the liquid delivery device 1 will be described using FIGS. 4 to 7.

Figure 4:
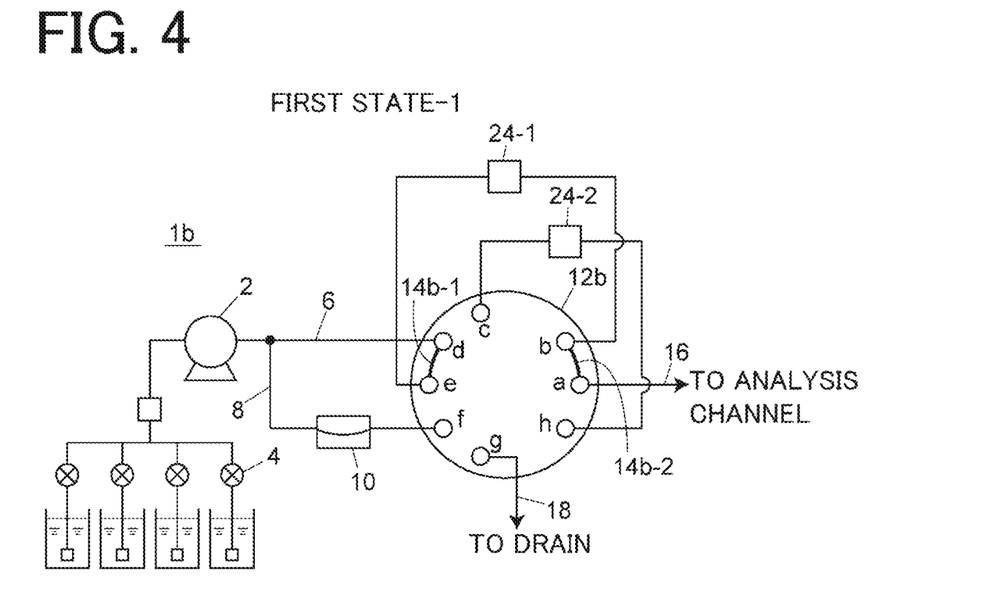
FIG. 4 is a channel configuration diagram when the switching valve is in a first state-1 in another embodiment of the liquid delivery device.

As shown in FIG. 4, in this embodiment 1b, a rotary switching valve 12b having eight ports "a" to "h" is provided. The ports "a" to "h" are disposed counterclockwise on the same circumference with the port "a" as a base point. Intervals between the ports "a" and "b", the ports "a" and "h", the ports "c" and "d", the ports "d" and "e", the ports "e" and "f", and the ports "f" and "g" are the same, and the size of the interval corresponds to, for example, 36 degrees in a rotation angle of the rotor. The intervals between the ports "b" and "c" and the ports "g" and "h" are the same, and the size of the interval corresponds to, for example, 72 degrees in a rotation angle of the rotor.

The rotor of the switching valve 12b is provided with two channels 14b-1 and 14b-2 for connecting the ports. Lengths of the channels 14b-1 and 14b-2 correspond to the intervals between the ports "a" and "b", the ports "a" and "h", the ports "c" and "d", the ports "d" and "e", the ports "e" and "f", and the ports "f" and "g".

In this embodiment 1b, two mixers 24-1 and 24-2 for mixing solvents discharged by the liquid delivery pump 2 are provided. The mixers 24-1 and 24-2 have capacities different from each other. The mixer 24-1 has an inlet connected to the port "e" of the switching valve 12b and an outlet connected to the port "b". The mixer 24-2 has an inlet connected to the port "c" of the switching valve 12b and an outlet connected to the port "h".

The port "a" of the switching valve 12b is an output port to which the discharge channel 16 leading to the analysis channel is connected, and the port "g" is a drain port to which the drain channel 18 leading to the drain is connected. The downstream end of the main channel 6 is connected to the port "d" of the switching valve 12b, and the downstream end of the branch channel 8 is connected to the port "f".

The switching valve 12b of this embodiment 1b is configured to be able to selectively switch between a first state-1 (a state of FIG. 4) in which the ports "a" and "b" are connected and the ports "d" and "e" are connected, a first state-2 (a state of FIG. 5) in which the ports "a" and "h" are connected and the ports "c" and "d" are connected, a second state (a state of FIG. 6) in which only the ports "f" and "g" are connected, and a third state (a state of FIG. 7) in which no ports are connected.

When the switching valve 12b is in the first state-1, as shown in FIG. 4, the main channel 6 is connected to the discharge channel 16 leading to the analysis channel via the mixer 24-1 and the branch channel 8 is not connected to any channel.

Figure 5:
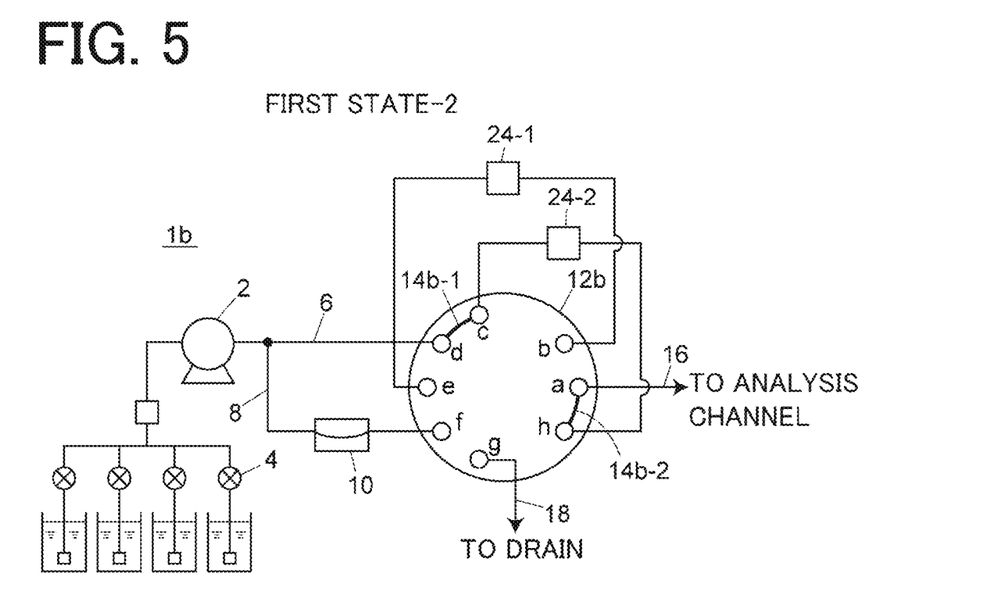
FIG. 5 is a channel configuration diagram when the switching valve is in a first state-2 in the embodiment.

When the switching valve 12b is in the first state-2, as shown in FIG. 5, the main channel 6 is connected to the discharge channel 16 leading to the analysis channel via the mixer 24-2 and the branch channel 8 is not connected to any channel.

That is, in this embodiment 1b, the switching valve 12b is switched to either the first state-1 or the first state-2 at the time of analysis, so that either one of the mixers 24-1 and 24-2 having different capacities can be selected and used.

Figure 6:
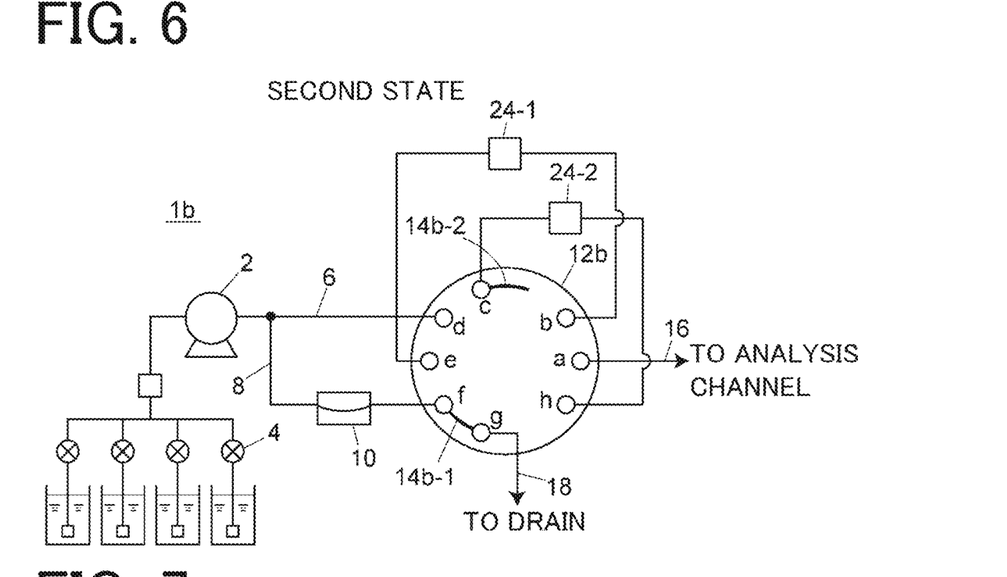
FIG. 6 is a channel configuration diagram when the switching valve is in the second state in the embodiment.

When the switching valve 12b is in the second state, as shown in FIG. 6, the branch channel 8 is connected to the drain channel 18 leading to the drain, and the main channel 6 and the analysis channel are disconnected. In this second state, the inside of the branch channel 8 can be purged with high efficiency.

Figure 7:
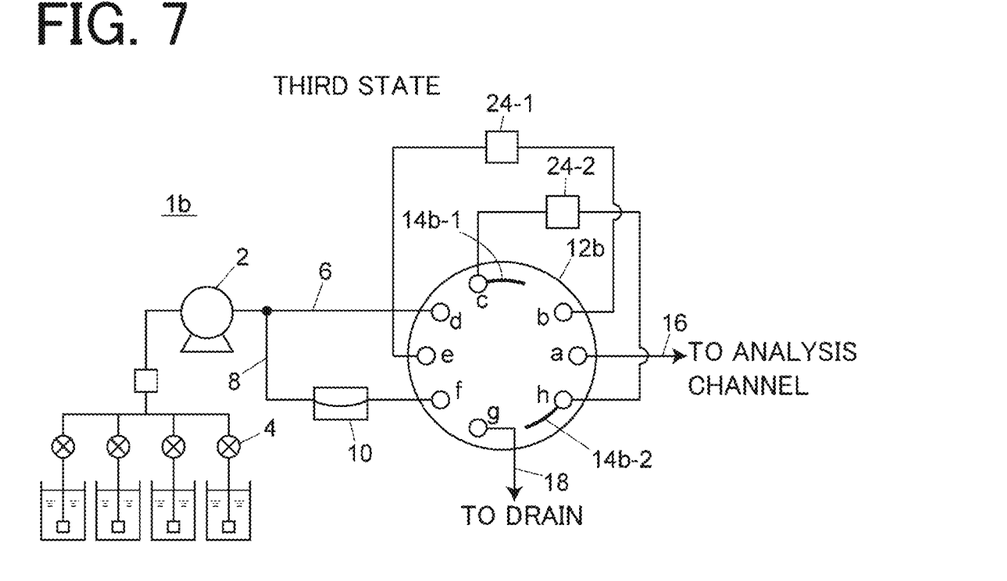
FIG. 7 is a channel configuration diagram when the switching valve is in the third state in the embodiment.

When the switching valve 12b is in the third state, as shown in FIG. 7, both the main channel 6 and the branch channel 8 are not connected to any channel, and a system including the switching valve 2, the main channel 6, and the branch channel 8 becomes a closed system.

The state of FIG. 7 is the same as the third state (see FIG. 3) of the embodiment 1a, and the presence or absence of a liquid leakage can be detected by the presence or absence of liquid delivery by the liquid delivery pump 2. Therefore, although not shown in FIG. 7, in a similar manner as shown in FIG. 3, the control part 20 that controls operation of the liquid delivery pump 2 and the switching valve 12a may be provided with the leakage amount calculation part 22 that obtains a leakage amount in the system including the liquid delivery pump 2, the main channel 6, and the branch channel 8 based on a liquid delivery amount by the liquid delivery pump 2 when the switching valve 12a is set to be in the third state. Alternatively, the leakage amount calculation part 22 may estimate a leakage amount from a range of a pressure drop or a slope of a pressure drop with respect to time when the liquid delivery pump pressurizes liquid delivery in a state where a system including the liquid delivery pump, the main channel, and the branch channel is set to be a closed system, and then a pressure drop of the system is measured in a state where the liquid delivery is stopped.

The third embodiment 1c of the liquid delivery device 1 will be described with reference to FIGS. 8 to 10.

Figure 8:
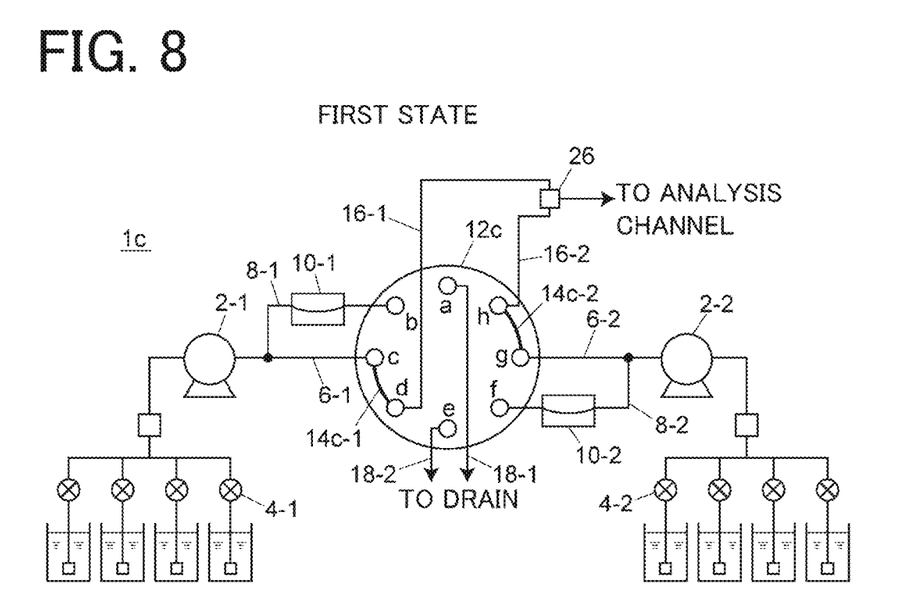
FIG. 8 is a channel configuration diagram when the switching valve is in the first state in still another embodiment of the liquid delivery device.

As shown in FIG. 8, this embodiment 1c mainly includes a liquid delivery pump 2-1 that delivers a solvent selected by a solvent selection valve 4-1, a liquid delivery pump 2-2 that delivers a solvent selected by a solvent selection valve 4-2, and a rotary switching valve 12c configured to selectively switch a channel configuration.

A main channel 6-1 in which discharged liquid flows and a branch channel 8-1 branched from the main channel 6-1 are provided downstream of the liquid delivery pump 2-1. Downstream ends of the main channel 6-1 and the branch channel 8-1 are connected to different ports "b" and "c" of the switching valve 12c. A main channel 6-2 in which discharged liquid flows and a branch channel 8-2 branched from the main channel 6-2 are provided downstream of the liquid delivery pump 2-2. Downstream ends of the main channel 6-2 and the branch channel 8-2 are connected to different ports "g" and "f" of the switching valve 12c.

The switching valve 12c has eight ports "a" to "h". The ports "a" to are disposed at equal intervals counterclockwise from the port "a" on the same circumference, and an interval between the ports corresponds to, for example, 45 degrees in a rotation angle of the rotor. The rotor of the switching valve 12c is provided with two channels 14c-1 and 14c-2 for selectively connecting the ports "a" to "h". The lengths of the channels 14c-1 and 14c-2 correspond to an interval between the ports adjacent to each other.

The ports "a" and "e" of the switching valve 12c are drain ports, to which drain channels 18-1 and 18-2 leading to the drains are connected. To the ports "d" and "h", discharge channels 16-1 and 16-2 communicating with the analysis channel via a mixer 26 are connected respectively. That is, the ports and "h" are output ports for outputting a solvent discharged from the liquid delivery pumps 2-1 and 2-2 to the analysis channel, respectively.

The downstream end of the branch channel 8-1 is connected to the port "b" of the switching valve 12c, the downstream end of the main channel 6-1 is connected to the port "c", the downstream end of the branch channel 8-2 is connected to the port "f", and the downstream end of the main channel 6-2 is connected to the port "g".

The switching valve 12c is configured to be able to selectively switch between a first state (a state of FIG. 8) in which the ports "c" and "d" are connected and the ports "g" and "h" are connected, a second state (a state of FIG. 9) in which the ports "a" and "b" are connected and the ports "e" and "f" are connected, and a third state (a state of FIG. 10) in which the ports "b" and "c" are connected and the ports "f" and "g" are connected.

When the switching valve 12c is in the first state, as shown in FIG. 8, the main channel 6-1 is connected to the discharge channel 16-1 that leads to the analysis channel, and the main channel 6-2 is connected to the discharge channel 16-2 leading to the analysis channel, while the branch channels 8-1 and 8-2 are not connected to any channel. When the switching valve 12c is in the first state in the analysis by the liquid chromatograph, a solvent discharged by the liquid delivery pump 2-1 and a solvent discharged by the liquid delivery pump 2-2 are mixed by the mixer 26, and a liquid mixture is supplied to the analysis channel. At this time, the downstream ends of the branch channels 8-1 and 8-2 are closed, and a solvent discharged by the liquid delivery pumps 2-1 and 2-2 does not flow in the branch channels 8-1 and 8-2.

Since the internal capacity of the dampers 10-1 and 10-2 provided on the branch channels 8-1 and 8-2 changes in accordance with liquid delivery pressure by the liquid delivery pumps 2-1 and 2-2, a fluctuation of the liquid delivery pressure by the liquid delivery pumps 2-1 and 2-2 is absorbed by the dampers 10-1 and 2-2, and stabilization of a liquid delivery flow rate to the analysis channel is achieved.

Figure 9:
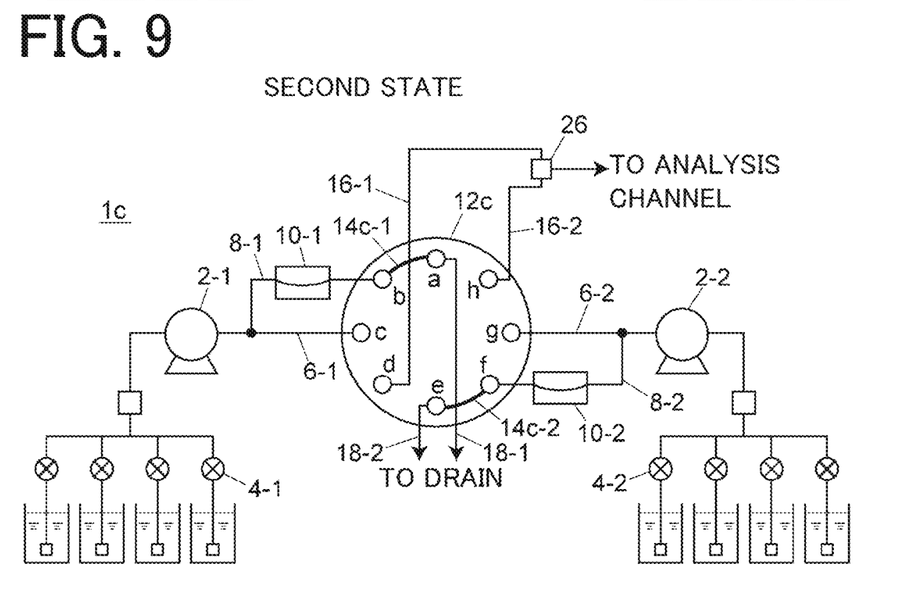
FIG. 9 is a channel configuration diagram when the switching valve is in the second state in the embodiment.

When the switching valve 12c is in the second state, as shown in FIG. 9, the branch channels 8-1 and 8-2 are respectively connected to the drain channels 18-1 and 18-2 leading to the drain, while the main channels 6-1 and 6-2 are not connected to any channel. By bringing the switching valve 12c into this second state when the inside of the branch channels 8-1 and 8-2 is purged, an entire solvent discharged by the liquid delivery pumps 2-1 and 2-2 can be reliably supplied to the branch channels 8-1 and 8-2, and it is possible to prevent part of a solvent for purging from flowing into the analysis channel.

Figure 10:
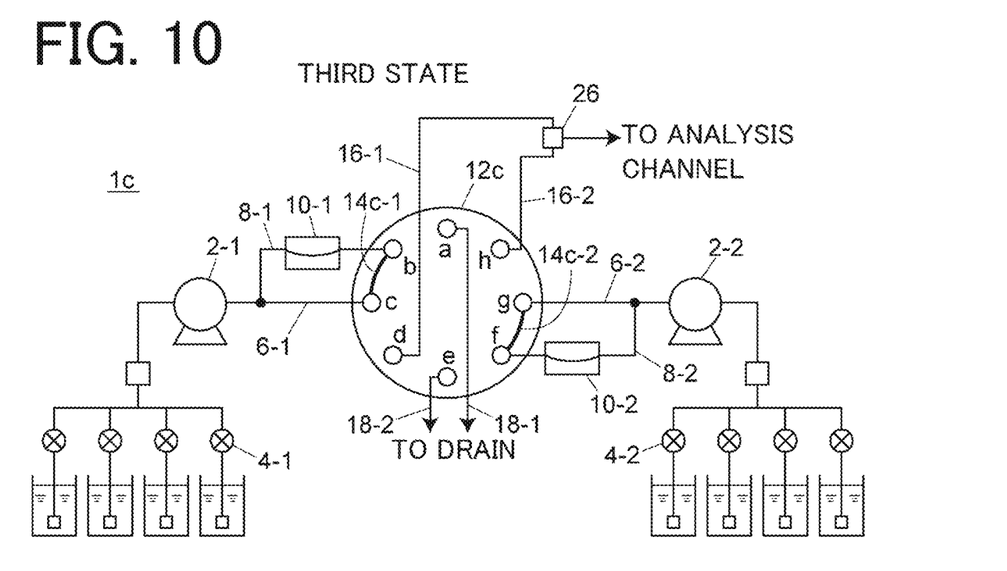
FIG. 10 is a channel configuration diagram when the switching valve is in the third state in the embodiment.

When the switching valve 12c is in the third state, as shown in FIG. 10, the downstream end of the main channel 6-1 and the downstream end of the branch channel 8-1 communicate with each other via the channel 14c-1, and the downstream end of the main channel 6-2 and the downstream end of the branch channel 8-2 communicate with each other via the channel 14c-2. In this manner, a system including the liquid delivery pump 2-1, the main channel 6-1, and the branch channel 8-1, and a system including the liquid delivery pump 2-2, the main channel 6-2, and the branch channel 8-2 become a closed system.

The state of FIG. 10 is the same as the third state (see FIG. 3) of the embodiment 1a, and the presence or absence of liquid leakage can be detected by the presence or absence of liquid delivery by the liquid delivery pumps 2-1 and 2-2. Therefore, although not shown in FIG. 10, in a similar manner as shown in FIG. 3, the control part 20 that controls operation of the liquid delivery pumps 2-1 and 2-2 and the switching valve 12c may be provided with the leakage amount calculation part 22 that obtains a leakage amount in the system including the liquid delivery pump 2-1, the main channel 6-1, and the branch channel 8-1 and in the system including the liquid delivery pump 2-2, the main channel 6-2, and the branch channel 8-2 based on a liquid delivery amount by the liquid delivery pumps 2-1 and 2-2 when the switching valve 12c is set to be in the third state. Alternatively, the leakage amount calculation part 22 may estimate a leakage amount from a range of a pressure drop or a slope of a pressure drop with respect to time when the liquid delivery pump pressurizes liquid delivery in a state where a system including the liquid delivery pump, the main channel, and the branch channel is set to be a closed system, and then a pressure drop of the system is measured in a state where the liquid delivery is stopped.

The fourth embodiment 1d of the liquid delivery device 1 will be described with reference to FIGS. 11 to 14.

Figure 11:
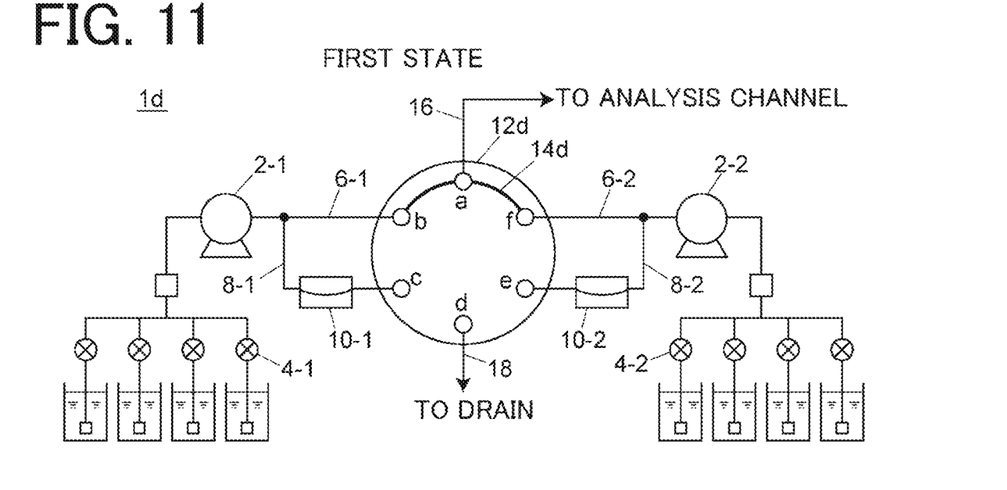
FIG. 11 is a channel configuration diagram when the switching valve is in the first state in still another embodiment of the liquid delivery device.

As shown in FIG. 11, this embodiment 1d includes two of the liquid delivery pumps 2-1 and 2-2 as in the embodiment 1c, and a channel configuration is configured to be switched by a rotary switching valve 12d.

The downstream ends of the main channel 6-1 and the branch channel 8-1 provided downstream of the liquid delivery pump 2-1 are connected to different ports "b" and "c" of the switching valve 12d. The downstream ends of the main channel 6-2 and the branch channel 8-2 provided downstream of the liquid delivery pump 2-2 are connected to different ports "f" and "g" of the switching valve 12d.

The switching valve 12d has six ports "a" to "f". The ports "a" to "f" are disposed at equal intervals counterclockwise from the port "a" on the same circumference, and an interval between the ports is equivalent to 60 degrees in a rotation angle of the rotor. The rotor of the switching valve 12d is provided with a channel 14d for selectively connecting the ports "a" to "f". The channel 14d has a length capable of simultaneously connecting three ports, which corresponds to 120 degrees in a rotation angle of the rotor.

The port "a" of the switching valve 12d is an output port to which the discharge channel 16 leading to the analysis channel is connected, and the port "d" is a drain port to which the drain channel 18 leading to the drain is connected.

The switching valve 12d is configured to be able to selectively switch between a first state (a state of FIG. 11) in which the ports "f"-"a"-"b" communicate with each other, a second state (a state of FIG. 12) in which the ports "c"-"d"-"e" communicate with each other, a third state-1 (a state of FIG. 13) in which the ports "f" and "e" do not communicate with any port, and a third state-2 (a state of FIG. 14) in which the ports "b" and "c" do not communicate with any port.

When the switching valve 12d is in the first state, as shown in FIG. 11, both the main channels 6-1 and 6-2 are connected to the discharge channel 16-1 leading to the analysis channel, while the branch channels 8-1 and 8-2 are not connected to any channel. When the switching valve 12d is in the first state in the analysis by the liquid chromatograph, a solvent discharged by the liquid delivery pumps 2-1 and 2-2 is supplied to the analysis channel. At this time, the downstream ends of the branch channels 8-1 and 8-2 are closed, and a solvent discharged by the liquid delivery pumps 2-1 and 2-2 does not flow in the branch channels 8-1 and 8-2.

Since the internal capacity of the dampers 10-1 and 10-2 provided on the branch channels 8-1 and 8-2 changes in accordance with liquid delivery pressure by the liquid delivery pumps 2-1 and 2-2, a fluctuation of the liquid delivery pressure by the liquid delivery pumps 2-1 and 2-2 is absorbed by the dampers 10-1 and 2-2, and stabilization of a liquid delivery flow rate to the analysis channel is achieved.

Figure 12:
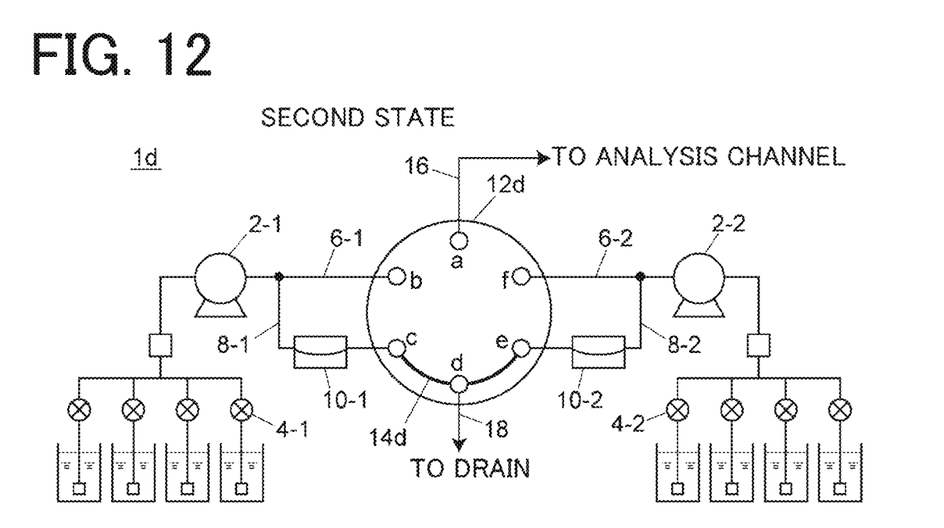
FIG. 12 is a channel configuration diagram when the switching valve is in the second state in the embodiment.

When the switching valve 12d is in the second state, as shown in FIG. 12, the branch channels 8-1 and 8-2 are connected to the drain, while the main channels 6-1 and 6-2 are not connected to any channel. By bringing the switching valve 12d into this second state when the inside of the branch channels 8-1 and 8-2 is purged, an entire solvent discharged by the liquid delivery pumps 2-1 and 2-2 can be reliably supplied to the branch channels 8-1 and 8-2, and it is possible to prevent part of a solvent for purging from flowing into the analysis channel.

Figure 13:
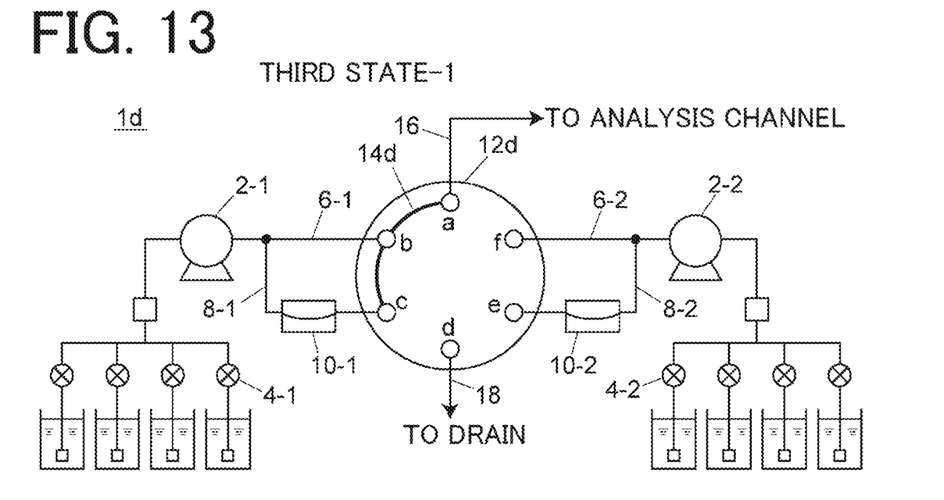
FIG. 13 is a channel configuration diagram when the switching valve is in the third state-1 in the embodiment.

When the switching valve 12d is in the third state-1, as shown in FIG. 13, the main channel 6-2 and the branch channel 8-2 are not connected to any channel, and a system including the liquid delivery pump 2-2, the main channel 6-2, and the branch channel 8-2 becomes a closed system.

Figure 14:
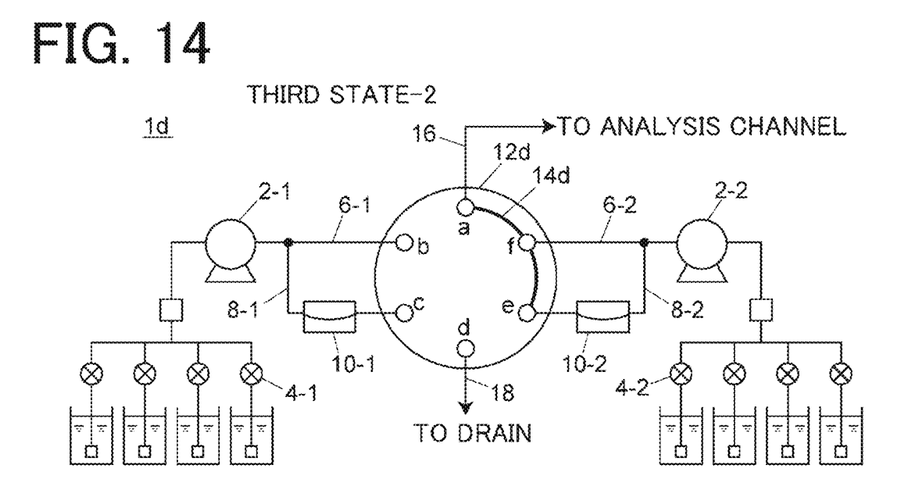
FIG. 14 is a channel configuration diagram when the switching valve is in the third state-2 in the embodiment.

When the switching valve 12d is in the third state-2, as shown in FIG. 14, both the main channel 6-1 and the branch channel 8-1 are not connected to any channel, and a system including the liquid delivery pump 2-1, the main channel 6-1, and the branch channel 8-1 becomes a closed system.

The states of FIG. 13 and FIG. 14 are the same as the third state (see FIG. 3) of the embodiment 1a, and the presence or absence of liquid leakage can be detected based on the presence or absence of liquid delivery by the liquid delivery pumps 2-1 and 2-2. Therefore, although not shown in FIG. 13 or FIG. 14, in a similar manner as shown in FIG. 3, the control part 20 that controls operation of the liquid delivery pumps 2-1 and 2-2 and the switching valve 12d may be provided with the leakage amount calculation part 22 that obtains a leakage amount in the system including the liquid delivery pump 2-1, the main channel 6-1, and the branch channel 8-1 and in the system including the liquid delivery pump 2-2, the main channel 6-2, and the branch channel 8-2 based on a liquid delivery amount by the liquid delivery pumps 2-1 and 2-2 when the switching valve 12d is set to be in the third state-1 and the third state-2. Alternatively, the leakage amount calculation part 22 may estimate a leakage amount from a range of a pressure drop or a slope of a pressure drop with respect to time when the liquid delivery pump pressurizes liquid delivery in a state where a system including the liquid delivery pump, the main channel, and the branch channel is set to be a closed system, and then a pressure drop of the system is measured in a state where the liquid delivery is stopped.

Figure 15:
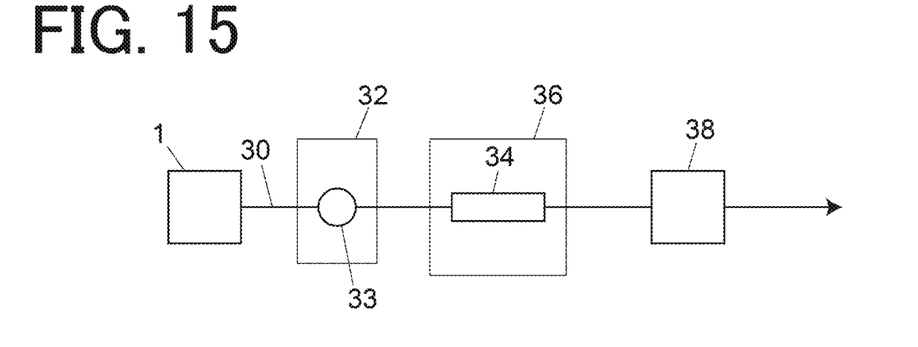
FIG. 15 is a channel configuration diagram showing one embodiment of a liquid chromatograph.

Next, an embodiment of a liquid chromatograph including the liquid delivery device 1 will be described with reference to FIG. 15.

The liquid chromatograph of this embodiment includes the liquid delivery device 1 realized by the above-mentioned embodiments 1a to 1d, an analysis channel 30, a sample injection part 32, a separation column 34, a column oven 36, and a detector 38.

The liquid delivery device 1 is connected to an upstream end of the analysis channel 30, and delivers a mobile phase in the analysis channel 30. The sample injection part 32 is provided at a position downstream of the liquid delivery device 1 on the analysis channel 30, and injects a sample into the analysis channel 30. The sample injection part 32 includes an injection valve 33, and is configured to introduce a sample collected from a sample container into the analysis channel 30 by switching the injection valve 33.

The separation column 34 is provided at a position downstream of the sample injection part 32 on the analysis channel 30. The separation column 34 separates the sample injected into the analysis channel 30 by the sample injection part 32 into components. The separation column 34 is accommodated in the column oven 36 and has its temperature controlled.

The detector 38 is provided at a position downstream of the separation column 34 on the analysis channel 30. The detector 34 is for detecting a sample component separated in the separation column 34.

The sample injected into the analysis channel 30 by the sample injection part 32 is carried to the separation column 34 by the mobile phase delivered by the liquid delivery device 1. In the separation column 34, the sample is separated temporally for each component, sequentially eluted from the separation column 34 to be introduced into the detector 38, and detected.

The invention claimed is:

1. A liquid delivery device for delivering through an analysis channel, on which a separation column is provided, of a liquid chromatograph comprising:
   at least one liquid delivery pump for delivering liquid;
   at least one main channel communicating with an outlet of the liquid delivery pump;
   at least one branch channel branched from the main channel; and
   a switching valve comprising a plurality of ports for connecting channels, wherein the plurality of ports include a port to which the main channel is connected, a port to which the branch channel is connected, at least one output port for outputting liquid delivered by the liquid delivery pump to the analysis channel, and at least one drain port leading to a drain, the switching valve is configured to be selectively switched to a first state and a second state, the first state is a state in which the main channel is connected to the output port while the branch channel is not connected to any channel via the switching valve, and the second state is a state in which the branch channel is connected to the drain port while the main channel is not connected to any channel via the switching valve.

2. The liquid delivery device according to claim 1, further comprising a plurality of mixers whose capacities are different from each other, and the mixers have one end and an other end connected to different ports of the plurality of ports of the switching valve respectively, wherein
   in the first state, the switching valve is configured to selectively interpose any one of the plurality of mixers between the main channel and the output port.

3. The liquid delivery device according to claim 1, comprising a plurality of liquid delivery pumps, and a plurality of main channels and branch channels corresponding to each of the plurality of liquid delivery pumps, wherein
   the switching valve is configured to connect all the main channels to the output port while not connecting all the branch channels to any channel via the switching valve in the first state, and to connect all the branch channels to the drain port while not connecting all the main channels to any channel via the switching valve in the second state.

4. The liquid delivery device according to claim 3, wherein the switching valve includes a plurality of output ports corresponding to the plurality of main channels, and a plurality of drain ports corresponding to the plurality of the branch channels, and the switching valve is configured to connect all the main channels to the corresponding output ports in the first state, and to connect all the branch channels to the corresponding drain ports in the second state.

5. The liquid delivery device according to claim 3, wherein the switching valve is configured to connect all the main channels to a common output port in the first state, and to connect all the branch channels to a common drain port in the second state.

6. The liquid delivery device according to claim 1, wherein a damper is provided on the branch channel to suppress fluctuation in liquid delivery pressure by the liquid delivery pump.

7. The liquid delivery device according to claim 1, wherein the switching valve is configured to be selectively switched to a third state in which a system downstream of the liquid delivery pump including the main channel; and the branch channel is set to be a closed system.

8. The liquid delivery device according to claim 7, wherein the switching valve is configured to communicate between the port to which the main channel is connected and the port to which the branch channel is connected in the third state.

9. The liquid delivery device according to claim 7, further comprising:
  a leakage amount calculation part configured to calculate a leakage amount in the system based on a liquid delivery flow rate by the liquid delivery pump in the third state, or based on a pressure drop range when liquid delivery is stopped after liquid delivery pressurization or a slope of a pressure drop per part time.

10. A liquid chromatograph comprising:
an analysis channel;
a liquid delivery device configured to deliver a mobile phase through the analysis channel;
a sample injection part configured to inject a sample into the analysis channel;
a separation column that is provided downstream of the sample injection part on the analysis channel to separate a sample injected into the analysis channel by the sample injection part into components; and
a detector that is provided downstream of the separation column on the analysis channel, and detects a sample component separated by the separation column, wherein
the liquid delivery device comprises:
at least one liquid delivery pump for delivering liquid;
at least one main channel communicating with an outlet of the liquid delivery pump;
at least one branch channel branched from the main channel; and
a switching valve comprising a plurality of ports for connecting channels, wherein the plurality of ports include a port to which the main channel is connected, a port to which the branch channel is connected, at least one output port for outputting liquid delivered by the liquid delivery pump to the analysis channel, and at least one drain port leading to a drain, the switching valve is configured to be selectively switched to a first state and a second state, the first state is a state in which the main channel is connected to the output port while the branch channel is not connected to any channel via the switching valve, and the second state is a state in which the branch channel is connected to the drain port while the main channel is not connected to any channel via the switching valve.

* * * * *